(12) United States Patent
Suddreth et al.

(10) Patent No.: US 10,720,064 B2
(45) Date of Patent: *Jul. 21, 2020

(54) SYSTEMS AND METHODS FOR GENERATING AVIONIC DISPLAYS INCLUDING FORECAST OVERPRESSURE EVENT SYMBOLOGY

(71) Applicant: HONEYWELL INTERNATIONAL INC., Morris Plains, NJ (US)

(72) Inventors: John G. Suddreth, Cave Creek, AZ (US); Marisela Mendez Tapia, San Jose, CA (US); Jerry Ball, Peoria, AZ (US); Mark Giddings, Mesa, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/235,923

(22) Filed: Dec. 28, 2018

(65) Prior Publication Data

US 2019/0137326 A1 May 9, 2019

Related U.S. Application Data

(63) Continuation of application No. 15/798,692, filed on Oct. 31, 2017, now Pat. No. 10,209,122.

(51) Int. Cl.
*G08G 5/00* (2006.01)
*G01H 1/00* (2006.01)
(Continued)

(52) U.S. Cl.
CPC ........... *G08G 5/0017* (2013.01); *B64C 30/00* (2013.01); *G01H 1/00* (2013.01); *G01H 5/00* (2013.01); *G01H 17/00* (2013.01); *G08G 5/0021* (2013.01)

(58) Field of Classification Search
CPC . B64C 30/00; G01H 1/00; G01H 5/00; G01H 11/00; G01H 17/00; G08G 5/0017; G08G 5/0021; G08G 5/00
See application file for complete search history.

(56) References Cited

U.S. PATENT DOCUMENTS 3,737,119 A 6/1973 Cheng
6,905,091 B2 6/2005 Berson et al.
(Continued)

OTHER PUBLICATIONS

Carlson, H.W. et al.; Simplified Sonic-Boom Prediction; NASA Technical Paper 1122, 1978.
(Continued)

*Primary Examiner* — Van T Trieu
(74) *Attorney, Agent, or Firm* — Lorenz & Kopf, LLP (57) ABSTRACT

Avionic display systems and methods are provided for generating avionic displays, which include symbology and other graphics pertaining to forecast overpressure events, which are forecast to occur during supersonic aircraft flight. In various embodiments, the avionic display system includes a display device on which an avionic display is produced. A controller architecture is operably coupled to the display device. Storage media contains computer-readable code or instructions that, when executed by the controller architecture, cause the avionic display system to determine whether an overpressure event is forecast to occur due to the predicted future occurrence of a sonic boom, which has a magnitude exceeding a boom tolerance threshold. When the controller architecture determines that an overpressure event is forecast to occur, the avionic display system further generates symbology on the avionic display indicative of or visually signifying the forecast overpressure event.

20 Claims, 5 Drawing Sheets

(51) Int. Cl.
  *G01H 5/00* (2006.01)
  *B64C 30/00* (2006.01)
  *G01H 17/00* (2006.01)

(56) References Cited

U.S. PATENT DOCUMENTS

| | | | |
|---|---|---|---|
| 7,475,848 B2 * | 1/2009 | Morgenstern | B64C 3/16 |
| | | | 244/123.1 |
| 7,599,805 B2 | 10/2009 | Pilon | |
| 8,145,366 B1 | 3/2012 | Haering, Jr. et al. | |
| 9,612,310 B2 * | 4/2017 | Schultz | G01S 3/80 |
| 2005/0098681 A1 | 5/2005 | Berson et al. | |
| 2008/0228413 A1 | 11/2008 | Pilon | |
| 2017/0132356 A1 | 5/2017 | Shen | |

OTHER PUBLICATIONS

Joslin et al.; Sonic Boom Awareness in the Civil Supersonic Cockpit; Flight Test Safety Workshop, Apr. 23-25, 2013.
Smith-Velazquez Laura M et al: "Synthetic vision display with integral sonic boom predictions", Proceedings of SPIE; [Proceedings of SPIE ISSN 0277-786X vol. 10524], SPIE, US, vol. 10197, May 5, 2015 (May 5, 2017), pp. 1019708-1019708, XP060088524, DOI: 10.1117/12.2262356 ISBN: 978-1-5106-1533-5.
Gpo: "14 CFR Part 36—Noise Standards: Aircraft Type and Airworthiness Certification", Code of Federal Regulations (CFR), Aug. 21, 2014 (Aug. 21, 2014), pp. 900-970, XP055564084, Retrieved from the Internet: URL:https://www.govinfo.gov//www.govinfo.gov/content/pkg/CFR-2011-title14-voll/pdf/CFR-2011-title14-voll-part36.pdf [retrieved on Mar. 4, 2019].

* cited by examiner

SYSTEMS AND METHODS FOR GENERATING AVIONIC DISPLAYS INCLUDING FORECAST OVERPRESSURE EVENT SYMBOLOGY

CROSS-REFERENCE TO RELATED APPLICATIONS

This application is a continuation of U.S. application Ser. No. 15/798,692, filed with the United Stated Patent and Trademark Office (USPTO) on Oct. 31, 2017, now U.S. Pat. No. 10,209,122.

STATEMENT REGARDING FEDERALLY SPONSORED RESEARCH OR DEVELOPMENT

This invention was made with Government support under Contract No. 7016372654 awarded by NASA. The Government has certain rights in the invention.

TECHNICAL FIELD

The following disclosure relates generally to avionic display systems and, more particularly, to systems and methods for generating avionic displays including symbology and other graphics pertaining to overpressure events forecast to occur during supersonic aircraft flight.

ABBREVIATIONS

Abbreviations appearing relatively infrequently in this document are defined upon initial usage, while abbreviations appearing more frequently in this document are defined below.
A/C—Aircraft;
AGL—Above Ground Level;
ATC—Air Traffic Controller;
FMS—Flight Management System;
HDD—Head Down Display;
HNAV—Horizontal Navigation;
HUD—Head Up Display;
PFD—Primary Flight Display;
UAV—Unmanned Aerial Vehicle; and
VNAV—Vertical Navigation.

BACKGROUND

Regulatory authorities currently restrict over-land supersonic flight of civilian A/C throughout much of the populated world. In the United States, for example, current Federal Aviation Administration (FAA) regulations prohibit supersonic flight of civilian A/C over land. Such restrictions are generally motived by noise abatement rationale and a desire to protect ground structures, such as building windows, from damage due to the pressure waves generated during supersonic air travel. These concerns notwithstanding, regulatory authorities have indicated that existing supersonic over-land flight restrictions might soon be eased, within certain limits. Industry attention has thus turned to the development and production of so-called "low boom" A/C suitable for service as commercial airliners or passenger jets operable at lower Mach speeds. As industry efforts increasingly focus on the development of low boom A/C, a corresponding demand arises for the development of tools and systems supporting civilian A/C engaged in supersonic flight, while ensuring adequate control of the pressure waves and noise levels produced by such supersonic air travel.

BRIEF SUMMARY

Avionic display systems are provided for generating avionic displays, which include symbology and other graphics pertaining to forecast overpressure events. In embodiments, the avionic display system includes a display device on which an avionic display, such as an HNAV or VNAV display, is produced. A controller architecture is operably coupled to the display device. Storage media contains computer-readable code or instructions that, when executed by the controller architecture, cause the avionic display system to determine whether an overpressure event is forecast due to the anticipated future occurrence of a sonic boom, which is predicted to have a magnitude exceeding a boom tolerance threshold. When the controller architecture determines that an overpressure event is forecast to occur, the avionic display system further generates symbology on the avionic display indicative of the forecast overpressure event. Such symbology may visually denote various characteristics relating to the forecasting overpressure event, such as the projected origin and/or a projected ground strike location of the sonic boom predicted to trigger the forecast overpressure event.

In further embodiments, the avionic display system includes a display device, a controller architecture operably coupled to the display device, and storage media containing computer-readable instructions or code. When executed by the controller architecture, the computer-readable instructions cause the avionic display system to repeatedly determine flight parameter margins enabling an A/C to travel at supersonic speeds, while avoiding the generation of a sonic boom having a magnitude exceeding a boom tolerance threshold. The avionic display system further generates graphics on the avionic display, which visually express or convey the flight parameter margins. The flight parameter margins can include, for example, minimum altitudes and/or maximum speeds at which the A/C can travel without triggering a sonic boom having a magnitude exceeding the boom tolerance threshold. The avionic display system may determine the flight parameter margins through independent calculations, by retrieval of the flight parameter margins from a remote source (e.g., a cloud-based forecasting service) in wireless communication with the display system, or utilizing a combination of these approaches.

Computer-implemented methods are further provided for generating avionic displays including symbology indicative of forecast overpressure events. Embodiments of the method may be carried-out by an avionic display system including a controller architecture and an avionic display. In implementations, the method includes the step or process of generating at least one avionic display, such as an HNAV or VNAV display, on the avionic display device. Utilizing the controller architecture, it is determined whether an overpressure event is forecast to occur during impending supersonic A/C flight due to the generation of a sonic boom having a magnitude exceeding a boom tolerance threshold. When determining that an overpressure event is forecast to occur, symbology is generated on the avionic display indicative of the forecast overpressure event. As stated above, such symbology may visually denote the projected origin and/or a projected ground strike location of the sonic boom predicted to trigger a particular overpressure event. Various other graphics, such as suggested preemptive actions suitably performed by an A/C to avert the occurrence of a forecast overpressure event, can also be presented on the avionic display in at least some instances.

The methods set-forth above and described elsewhere in this document can be implemented utilizing program products, such as software applications executed on suitably-equipped avionic display systems and disseminated in any suitable manner. Various additional examples, aspects, and other useful features of embodiments of the present disclosure will also become apparent to one of ordinary skill in the relevant industry given the additional description provided below.

BRIEF DESCRIPTION OF THE DRAWINGS

At least one example of the present invention will hereinafter be described in conjunction with the following figures, wherein like numerals denote like elements, and.

For simplicity and clarity of illustration, descriptions and details of well-known features and techniques may be omitted to avoid unnecessarily obscuring the exemplary and non-limiting embodiments of the invention described in the subsequent Detailed Description. It should further be understood that features or elements appearing in the accompanying figures are not necessarily drawn to scale unless otherwise stated.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect.

As appearing herein, the term "avionic display" refers to a computer-generated display or imagery, which depicts the flight environment of at least one A/C. Similarly, the term "avionic display system" refers to a system that generates at least one avionic display (as previously defined) during system operation. Generally, then, the term "avionic" may be regarded as synonymous with the term "aircraft-related" in the present context. The usage of the term "avionic" thus does not require that the avionic display system is deployed onboard an A/C in all instances. Indeed, in many implementations, some or all of the components contained in the avionic display system will not be located onboard an A/C. This may be the case when, for example, the avionic display system is utilized to pilot a UAV and certain components of the display system are located within the facility from which the UAV is controlled. This may also be the case when the avionic display system is utilized in directing or managing supersonic air traffic, in which case the display system may be situated within a control tower, an ATC facility, or another non-A/C location.

Overview

The following provides avionic display systems and methods for producing avionic displays including symbology pertaining to forecast overpressure events; that is, events or instances during which impending supersonic A/C flight is predicted to cause a sonic boom having a magnitude exceeding a boom tolerance threshold. When an overpressure event is forecast to occur, the avionic display system generates symbology on one or more avionic displays indicative of the forecast overpressure event. The symbology may visually identify the origin of a sonic boom, which is predicted to occur and ultimately trigger a forecast overpressure event. Additionally or alternatively, the forecast overpressure event symbology may identify a ground strike location of the forecast overpressure event; that is, a geographical location at which the sonic boom driving the overpressure event is projected to impact the earth (ground or water) generally located beneath the A/C engaged in supersonic flight. If desired, such symbology can be visually coded to indicate a projected severity of a forecast overpressure event as based upon, for example, an estimated disparity between the boom tolerance threshold and a magnitude of the sonic boom predicted to cause the overpressure event. Other graphics can also be generated on the avionic display(s) in conjunction with such forecast overpressure event symbology. For example, in embodiments, the avionic display system may also identify and present suggested preemptive actions, which can be implemented to avert the occurrence of forecast overpressure events.

In certain embodiments, the boom tolerance threshold may have a single value, which is universally applied in determining whether a predicted sonic boom will trigger an overpressure event regardless of the particular characteristics of the sonic boom under consideration. In other embodiments, the boom tolerance threshold may have a variable value, which is varied by the avionic display system based upon one or more characteristics of a predicted sonic boom. For example, in such embodiments, the avionic display system may assign a particular value to the boom tolerance threshold based upon a geographical location at which a sonic boom is predicted to originate or at which the sonic boom is projected to impact the earth (ground or water). By actively varying the value of the sonic boom threshold in this manner, sonic booms having greater intensities (e.g., higher peak pressure and decibel levels) may be permitted within certain (e.g., relatively unpopulated) geographical regions; while only low intensity sonic booms are tolerated in other (e.g., densely populated) geographical regions, if sonic booms are permitted in such regions at all. If desired, various other criteria can further be considered by the avionic display system in assigning values to the boom tolerance threshold including, for example, the time-of-day at which a particular sonic boom is predicted to occur.

In further implementations, the avionic display system may establish flight parameter margins at which an A/C can travel at supersonic speeds without triggering or inducing an overpressure event. The flight parameters can include, for example, minimum altitudes and/or maximum speeds at which the A/C can fly without causing an overpressure event. The avionic display system may establish such flight parameters by independent calculation or instead by retrieving the flight parameters from a remote source, such as a cloud-based forecasting service, dedicated to performing relatively complex sonic boom forecasting algorithms. The avionic display system may then visually convey the flight parameter margins on one or more avionic displays. As one possibility, the maximum speeds suitably flown by an A/C without triggering an overpressure event can be indicated at selected junctures or intervals along the projected flight path of the A/C by numerical readouts generated on an HNAV display, a VNAV display, or other avionic display. Comparatively, the minimum AGL altitudes suitably flown by the A/C without triggering an overpressure event may be expressed as visual markers (e.g., connected line segments) generated on a VNAV display.

By selectively generating one or more avionic displays to include forecast overpressure event symbology and/or other related graphics in the above-described manner, embodiments of the avionic display system can enhance the situational awareness of decision makers, such as pilots and ATC personnel members, responsible for piloting and managing A/C engaged in supersonic flight. Imparted with this awareness, the decision makers can then perform those actions appropriate to avert forecast overpressure events that may otherwise occur during supersonic A/C flight; or, in certain instances, to lessen the severity of overpressure events that cannot otherwise be averted. A reduction in the rate at which overpressure events occur can therefore be realized, even as regulatory restrictions governing the supersonic flight of civilization A/C over land are potentially relaxed or eased. This is highly desirable. An exemplary embodiment of an avionic display system suitable for generating forecast overpressure event symbology will now be described in conjunction with FIG. 1.

Figure 1:
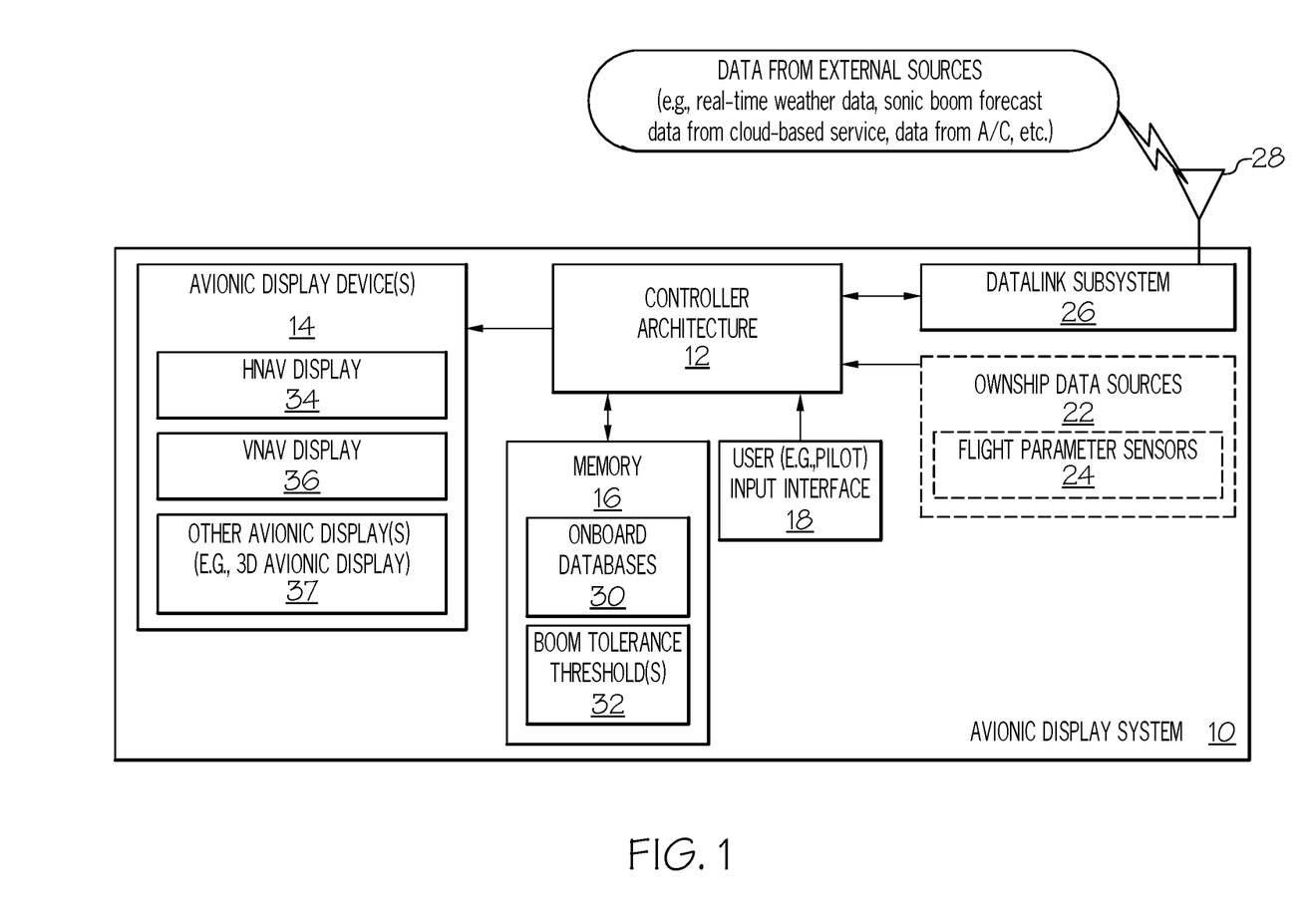
FIG. 1 is a block diagram of an avionic display system, which generates one or more avionic displays to selectively include forecast overpressure event symbology, as illustrated in accordance with an exemplary embodiment of the present disclosure.

Example of Avionic Display System Suitable for Generating Avionic Display(S) Including Forecast Overpressure Event Symbology FIG. 1 is a block diagram of an avionic display system 10, as illustrated in accordance with an exemplary and non-limiting embodiment of the present disclosure. As schematically shown, avionic display system 10 includes the following components or subsystems, each of which may assume the form of a single device or multiple interconnected devices: (i) a controller architecture 12, (ii) at least one avionic display device 14, (iii) computer-readable storage media or memory 16, and (iv) a user input interface 18. In embodiments in which avionic display system 10 is utilized to pilot an A/C, avionic display system 10 may further contain a number of ownship data sources 22 including, for example, an array of flight parameter sensors 24. Finally, avionic display system 10 can contain a datalink subsystem 26 including an antenna 28, which may wirelessly transmit data to and/or receive data from various sources external to display system 10. Such external sources can include, for example, ATC stations, nearby A/C, weather forecasting services, and remotely-located sonic boom forecasting services, to list but a few examples. In other embodiments, such as when display system 10 is utilized in directing or managing supersonic air traffic, avionic display system 10 may not contain ownship data sources 22, as indicated in FIG. 1 by the usage of phantom line.

When avionic display system 10 is utilized to pilot a manned A/C or "ownship A/C," the various components contained within display system 10 may be deployed onboard the ownship A/C. Comparatively, in embodiments in which avionic display system 10 is utilized to pilot a remotely-controlled UAV, certain components of avionic display system 10 may be carried by the UAV, while other components may be situated at the ground-based station or other facility from which the UAV is remotely piloted. For example, in such implementations, avionic display device(s) 14, user input interface 18, and some or all of the storage media contained in memory 16 may be located offboard the UAV. Finally, when utilized to direct or to manage supersonic air traffic (rather than in directly piloting an A/C), avionic display system 10 may not be deployed onboard an A/C, but rather situated in a control tower, in a ground-based ATC station, or in another location.

Generally, controller architecture 12 includes at least first, second, third, and fourth inputs, which are operatively coupled to user input interface 18, to memory 16, to ownship data sources 22 (when present), and to datalink subsystem 26, respectively. Controller architecture 12 also includes at least first, second, and third outputs, which are operatively coupled to avionic display device(s) 14, to memory 16, and to datalink subsystem 26, respectively. In further embodiments, avionic display system 10 may include a greater or lesser number of components, which may be interconnected in other manners utilizing any combination of wireless or hardline (e.g., avionic bus) connections. Although avionic display system 10 is schematically illustrated in FIG. 1 as a single unit, the individual elements and components of avionic display system 10 can be implemented in a distributed manner using any number of physically-distinct and operatively-interconnected pieces of hardware or equipment. Similarly, user input interface 18 can include various different types of hardware or software components, such as touchscreen devices, cursor devices, keyboards, voice recognition modules, and the like, suitable for recognizing input received from a pilot, an ATC personnel member, or other user of avionic display system 10.

Avionic display device(s) 14 can include any number and type of image generating devices. When avionic display system 10 is utilized to pilot a manned A/C, avionic display device(s) 14 may be affixed to the static structure of the A/C cockpit as, for example, one or more HDD or HUD units. Alternatively, in such embodiments, avionic display device(s) 14 may be a movable display device (e.g., a pilot-worn display device) or a portable display device, such as an Electronic Flight Bag (EFB), a laptop, or a tablet computer, which is carried into the cockpit of the manned A/C by a pilot or other aircrew member. Similarly, when avionic display system 10 is utilized to pilot a UAV, display device(s) 14 may be realized as one or more HDD or HUD units affixed to the static structure of a control facility, portable electronic device(s) carried into such a control facility, or movable display devices worn by a pilot when remotely operating the UAV. Finally, when avionic display system 10 is utilized to direct or manage supersonic air traffic, display device(s) 14 can be realized as one or more HDD display units, HUD display units, portable electronic devices, or head-worn display devices.

Controller architecture 12 can encompass or be associated with one or more processors, flight control computers, navigational equipment pieces, computer-readable memories (including or in addition to memory 16), power supplies, storage devices, interface cards, and other standardized components. Controller architecture 12 may also include or cooperate with any number of firmware and software programs or computer-readable instructions designed to carry-out the various process tasks, calculations, and control/display functions described herein. Although illustrated as a separate block in FIG. 1, memory 16 may be integrated into controller architecture 12 in embodiments as, for example, a system-in-package, a system-on-a-chip, or another type of microelectronic package or module. Controller architecture 12 may also exchange data with one or more external sources, such as a cloud-based forecasting service of the type described below, in various embodiments of avionic display system 10. In this case, bidirectional wireless data exchange may occur over a communications network, such as a public or private network implemented in accordance with Transmission Control Protocol/Internet Protocol architectures or other conventional protocols. Encryption and mutual authentication techniques may be applied, as appropriate, to ensure data security.

Memory 16 can encompass any number and type of storage media suitable for storing computer-readable code or instructions, as well as other data utilized to support the operation of avionic display system 10. In embodiments, memory 16 may store one or more local databases 30, such as geographical (terrain), runway, navigational, and historical weather databases. Such local databases 30 are beneficially updated on a periodic basis to maintain data timeliness; and, in embodiments in which display system 10 is utilized to pilot a manned A/C, the databases maintained in memory 16 may be shared by other systems onboard the A/C, such as an Enhanced Ground Proximity Warning System (EGPWS) or a Runway Awareness and Advisory System (RAAS). In other cases, one or more of databases 30 may be maintained by an external entity, such as a cloud-based forecasting service, which can be accessed by controller architecture 12 on an as-needed basis. As generically represented in FIG. 1 by box 32, memory 16 may further store one or more values associated with the below-described boom tolerance threshold. Finally, one or more A/C-specific sonic boom profiles may be stored within memory 16; e.g., in embodiments in which display system 10 is utilized to pilot a UAV or a manned A/C, memory 16 may store a sonic boom profile specific to an A/C on which display system 10 is deployed.

As previously mentioned, ownship data sources 22 may include a constellation of flight parameter sensors 24 in implementations in which display system 10 is utilized for piloting purposes. When present, flight parameter sensors 22 supply various types of data or measurements to controller architecture 12 recorded or captured during A/C flight. Such data can include without limitation: initial reference system measurements, Flight Path Angle (FPA) measurements, airspeed data, groundspeed data, altitude data, attitude data including pitch data and roll measurements, yaw data, data related to A/C weight, time/date information, heading information, data related to atmospheric conditions, flight path data, flight track data, radar altitude data, geometric altitude data, wind speed and direction data, and fuel consumption data. Further, in such embodiments, controller architecture 12 and the other components of avionic display system 10 may be included within or cooperate with any number and type of systems commonly deployed onboard A/C including, for example, an FMS, an Attitude Heading Reference System (AHRS), an Instrument Landing System (ILS), and an Inertial Reference System (IRS), to list but a few examples.

During operation, avionic display system 10 generates one or more avionic displays on avionic display device(s) 14. For example, as schematically indicated in FIG. 1, avionic display system 10 may generate a horizontal navigation display 34 on avionic display device(s) 14. As appearing herein, the term "horizontal navigation display" or, more succinctly, "HNAV display" refers to an avionic display presented from a top-down or planform viewpoint. In addition to or in lieu of HNAV display 34, at least one vertical navigation display 36 may be generated on avionic display device(s) 14 in at least some embodiments; the term "vertical navigation display" or "VNAV display" referring to an avionic display presented from a side or lateral viewpoint (also commonly referred to as a "vertical situation display"). In many implementations, avionic display system 10 may generate displays 34, 36 concurrently. For example, in this case, displays 34, 36 may be presented on separate screens of multiple avionic display devices 14 or, instead, on a single screen of one display device 14 in a picture-in-picture or side-by-side format. In other implementations, avionic display system 10 may only generate one of HNAV display 34 and VNAV display 36 at a given time and/or display system 10 may generate a different type of avionic display, as discussed below.

The foregoing paragraph and the following description focus primarily on the generation of forecast overpressure event symbology (and other related graphics) in the context of certain two dimensional (2D) avionic displays, such as HNAV display 34 and VNAV display 36 schematically shown in FIG. 1 and further discussed below in conjunction with FIGS. 3-4. This notwithstanding, it will be appreciated that the forecast overpressure event symbology (and the other related graphics described herein) can be generated on any type of avionic display or displays, which depict the flight environment of at least one A/C. For example, in alternative embodiments, the forecast overpressure event symbology may be generated on one or more 3D avionic displays, such as a PFD or an exocentric 3D avionic display, in addition or in lieu of one or more 2D avionic displays. To help emphasize this possibility, avionic display system 10 is further illustrated to include an "other" avionic display block 37 contained within avionic display device(s) block 14 in FIG. 1. An exemplary method, which can be performed by avionic display system 10 in generating one or more of avionic displays 34, 36, 37 to selectively include forecast overpressure event symbology, will now be described in conjunction with FIG. 2.

Figure 2:
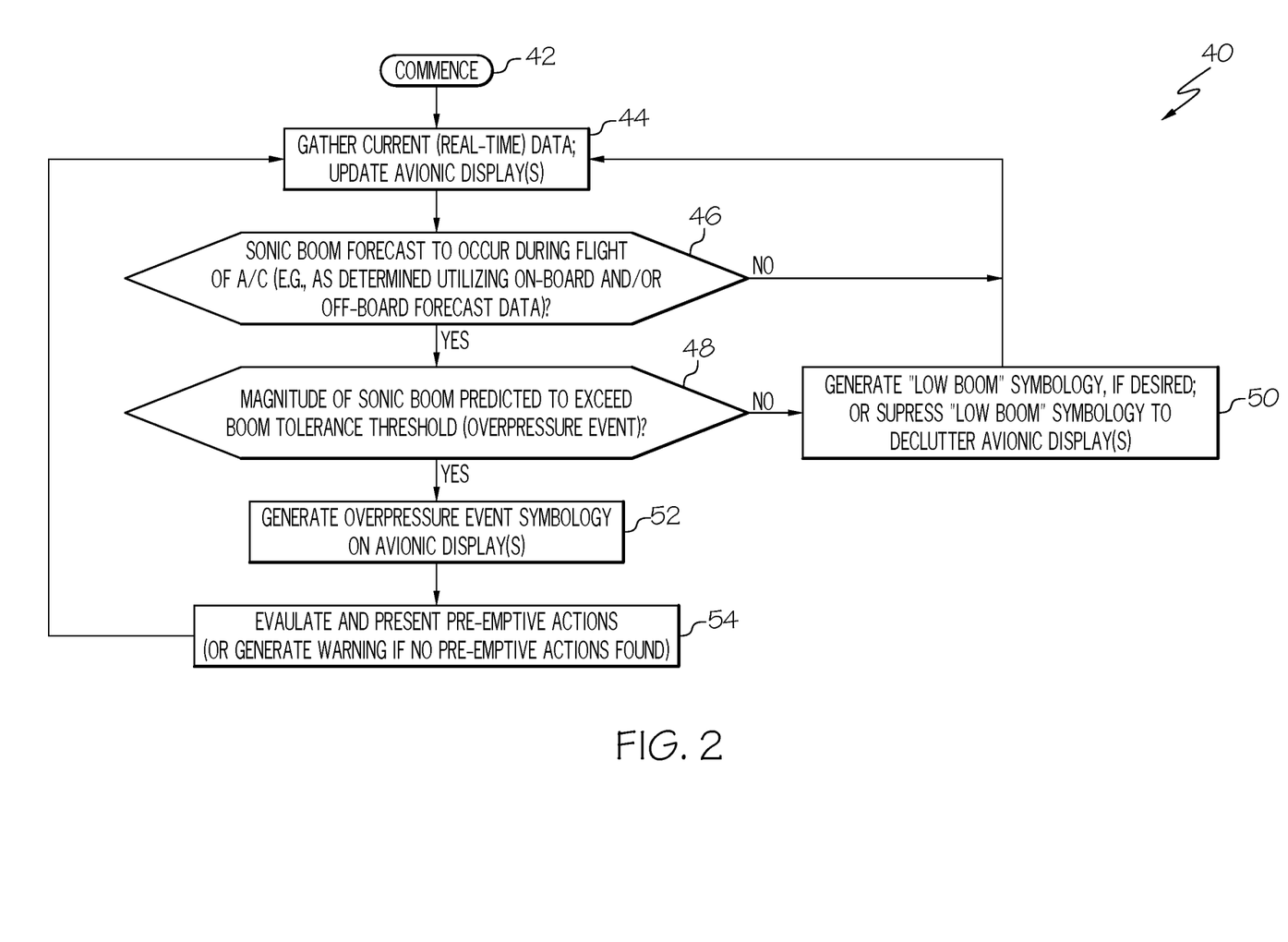
FIG. 2 is a flowchart of a process usefully carried-out by the avionic display system shown in FIG. 1 in generating one or more avionic displays to include forecast overpressure event symbology, as further illustrated in accordance with an exemplary embodiment of the present disclosure.

Exemplary Method for Generating Avionic Display(S) Including Forecast Overpressure Event Symbology FIG. 2 is a flowchart setting-forth an exemplary computer-implemented method 40, which can be performed by avionic display system 10 (FIG. 1) to selectively generate forecast overpressure event symbology on one or more of avionic displays 34, 36, 37 (FIG. 1). In the illustrated example, method 40 includes a number of computer-implemented functions or process steps identified as STEPS 42, 44, 46, 48, 50, 52, 54. Depending upon the particular manner in which method 40 is implemented, each process step generally illustrated in FIG. 2 may entail a single process or multiple sub-processes. The illustrated process steps are provided by way of non-limiting example only. In alternative embodiments, additional process steps may be performed, certain steps may be omitted, and/or the illustrated steps may be performed in alternative sequences.

Referring jointly to FIGS. 1-2, computer-implemented method 40 commences at STEP 42 (FIG. 2). In some embodiments, method 40 commences upon system startup and is then performed on a repeated or iterative basis until system shutdown. In other embodiments, method 40 may commence in response to input, such as pilot or ATC personnel input, entered via user input interface 18. In still other embodiments, method 40 can commence in response to the occurrence of a predetermined trigger event. For example, when avionic display system 10 is utilized for piloting an A/C, method 40 may automatically commence (that is, initiate without requiring additional user input) when the A/C surpasses a predetermined speed threshold. The predetermined speed threshold can be, for example, slightly below or above Mach 1 or a predetermined airspeed threshold; here, noting that any such airspeed threshold may be varied as a function of meteorological conditions affecting the speed at which sound or pressure waves propagate through the ambient environment. Following commencement, method 40 may then be performed iteratively on a relatively rapid (e.g., real-time) basis until termination.

At STEP 44 of method 40, data utilized in generation the avionic display(s) is gathered. When avionic display system 10 is utilized for piloting purposes, sensor data from ownship data sources 22 may be collected; e.g., data may be received from flight parameter sensors 24 and/or extracted from other systems carried by the A/C, such as an FMS. Stored data may also be recalled from one or more local databases 30 during STEP 44. Such data can include, for example, historical meteorological conditions, relevant terrain information, and/or appropriate values to assign to the boom tolerance threshold. Embodiments of avionic display system 10 can also gather data from any number of external sources during STEP 44 of method 40. The particular external sources from which such data is gathered will vary amongst embodiments depending upon, for example, whether display system 10 is utilized to pilot an A/C or to direct supersonic air traffic. Generally, however, avionic display system 10 may gather data from weather forecasting services, from other A/C traveling through or scheduled to travel through a particular airspace, and/or from a remote sonic boom forecasting service of the type described below. After collecting the pertinent data, avionic display system 10 then updates the avionic display(s) accordingly.

Next, at STEP 46 of method 40, avionic display system 10 determines whether a sonic boom is forecast to occur during the supersonic flight of one or more A/C, as projected into a future timeframe. Avionic display system 10 renders this determination utilizing sonic boom forecast data. Such sonic boom forecast data usefully indicates, expressly or implicitly, whether the impending supersonic flight of one or more A/C is likely to generate sonic pressure waves or "sonic booms" within certain confidence thresholds; and, if so, further indicates the projected locations and intensities of such sonic boom predictions. As a more specific example, the sonic boom forecast data may contain time-phased data specifying the anticipated locations, spread, and intensities of pressure waves resulting from sonic boom predictions, as mapped across three dimensional airspace. As a point of emphasis, the sonic boom forecast data can be generated utilizing any suitable algorithms or processes, which are carried-out by avionic display system 10 itself, by another entity in communication with display system 10, or a combination thereof. For example, in certain implementations, avionic display system 10 outsources the generation of sonic boom forecast data to a remote entity dedicated to performing such algorithms, such as a cloud-based forecasting service or server farm. In this manner, relatively complex, computationally-intensive forecasting algorithms are thus advantageously performed by the remote external entity to increase the speed and accuracy with which the sonic boom forecast data is generated, while processing demands placed on controller architecture 12 are reduced. In other embodiments, avionic display system 10 may independently generate the sonic boom forecast data, in whole or in part, when carrying-out method 40.

The sonic boom forecasting algorithms can consider a relatively comprehensive range of static and dynamic inputs in generating the sonic boom forecasting data. Meteorological conditions impacting the propagation of sonic pressure waves through the ambient environment are usefully considered, including current wind speeds and directions, air temperatures, humidity levels, and information regarding the presence of rain, sleet, snow, or other precipitation. Data regarding current meteorological conditions may be extracted from XM weather broadcasts or similar reports transmitted by dedicated weather forecast services. Additionally or alternatively, measurements of current meteorological conditions can be obtained from flight parameter sensors 24 when included within display system 10.

The sonic boom forecasting algorithms further consider the predicted future flight parameters of one or more A/C. A non-exhaustive list of such flight parameters include the FPA, speed, and location (longitude, latitude, and altitude) of at least one A/C, which is presently engaged in or which is anticipated to engage in supersonic flight. Such future A/C flight parameters may be extrapolated from current A/C flight parameters or, perhaps, derived from flight plan information extracted from an FMS or other onboard system. In one approach, the supersonic flight of a given A/C is predicted based upon the current flight vector data and flight trends of the A/C; e.g., the time-correlated position and supersonic speed of the A/C may be extrapolated into a future timeframe based upon the current speed, attitude, direction, and FPA of the A/C. Further, when avionic display system 10 is located offboard an A/C, in whole or in part, such data may be transmitted to display system 10 from an A/C. For example, when avionic display system 10 is utilized for air traffic management, flight plan information and/or other relevant data pertaining to one or more A/C may be provided to display system 10 as Automatic Dependent Surveillance-Broadcast (ADS-B) transmissions or other data transmissions.

In certain embodiments, A/C-specific sonic boom profiles are further taken into account when generating or interpreting the sonic boom forecast data. Generally, an A/C-specific sonic boom profile provides an approximation of the three dimensional pressure wave shape created by a particular A/C when engaged in supersonic flight. The sonic boom profile for a particular A/C may be determined upon the physical characteristics of the A/C, such as shape, weight class, and engine type. In embodiments, avionic display system 10 may store one or more A/C-specific sonic boom profiles in memory 16 and recall such profiles during the course of method 40, when needed. In one implementation, avionic display system 10 may store a sonic boom profile specific to the ownship A/C in memory 16 and then recall this sonic boom profile when independently performing onboard forecasting algorithms. Alternatively, controller architecture 12 may recall and transmit the A/C-specific sonic boom profile, along with other pertinent data (e.g., current flight vector data and/or flight plan information) to a remote entity for consideration when carry-out the sonic boom forecasting algorithms utilized to generate the sonic boom forecast data.

Advancing to STEP 46 of method 40, avionic display system 10 next analyzes the recently obtained sonic boom forecast data to determine whether a sonic boom is forecast to occur during impending A/C flight. If the sonic boom forecast data does not portend the occurrence of a sonic boom, avionic display system 10 returns to STEP 44 of method 40 and the above-described process steps repeat. Conversely, if a sonic boom is forecast to occur, avionic display system 10 progresses to STEP 48 of method 40. At STEP 48, avionic display system 10 determines whether a reference magnitude (e.g., a pressure or decibel level) of the predicted sonic boom exceeds the corresponding boom tolerance threshold and, therefore, whether an overpressure event is forecast to occur. The reference magnitude of the forecast sonic boom may be the maximum or peak magnitude of the sonic boom, considered in its entirety. Alternatively, the reference magnitude of the forecast sonic boom may be an estimated pressure or decibel level taken at a particular location encompassed by a sonic boom prediction, such as the pressure or decibel level taken at the projected origin of the sonic boom or at a location at which the sonic boom is projected to strike the earth. This latter approach may be particularly beneficial as it will typically better estimate the impact of the sonic boom on human populations, manmade structures, and other ground-based items in proximity of the overpressure event.

In determining whether an overpressure event is forecast to occur due to the future anticipated occurrence of a sonic boom, avionic display system 10 assigns a value to the boom tolerance threshold for comparison purposes. In certain implementations, a single or universal boom tolerance threshold value may be assigned to the boom tolerance threshold, stored in memory 16, and recalled by controller architecture 12 during STEP 48 of method 40. In such implementations, avionic display system 10 may utilize the same boom tolerance threshold in evaluating all predicted sonic booms, regardless of the particular characteristics of a given sonic boom prediction. While a single value is assigned to the sonic boom threshold in such embodiments, avionic display system 10 may allow the value of the boom tolerance threshold to be modified through software updates, pilot input, by ATC communications, or in another manner. In other implementations, the boom tolerance threshold may have a dynamic or variable value, which is actively modified or varied by avionic display system 10 as a function of one or more parameters relating to a particular forecast overpressure event. In this latter case, memory 16 may store a range of boom tolerance threshold values differentiated by or corresponding to varying geographical zones, to varying times of day, or to other differentiating factors.

In embodiments in which memory 16 stores multiple values for the boom tolerance threshold, the boom tolerance threshold values are usefully georeferenced; that is, differentiated by geographical location or region. By actively varying the value of the sonic boom threshold in relation to geographical region, more intensive sonic booms (that is, sonic booms having greater pressures or decibel levels) may be permitted within certain geographical regions, such as those that are relatively unpopulated; while only sonic booms of relatively low intensities may be permitted in other geographical regions, such as those that are densely populated, or sonic booms may be strictly banned in such regions. Furthermore, such georeferenced values can be varied as a function of local or regional noise abatement regulations, political boundaries, the type and vulnerability of manmade structures within a region to pressure wave damage, proximity to land if a sonic boom is forecast to occur over water, and various other parameters. Other characteristics pertaining to predicted sonic booms and, specifically, overpressure events can further be utilized in differentiating amongst boom tolerance threshold values in embodiments. For example, the values assigned to boom tolerance threshold are usefully varied based upon the time-of-day at which a particular sonic boom is predicted to occur; e.g., in this latter regard, higher (more permissive) values may be assigned to the boom tolerance threshold during waking hours, while lower (more stringent) threshold values may apply at times during which local populations are largely asleep and, therefore, prone to disturbance by excessively loud sonic booms.

In the above-described manner, avionic display system 10 determines whether the reference magnitude of any sonic boom prediction(s) remain below a corresponding boom tolerance threshold and, therefore, whether an overpressure event is forecast to occur. If determining that a sonic boom is forecast to occur, but is not predicted to drive or induce an overpressure event, avionic display system 10 advances to STEP 50 of method 40. At this step, avionic display system 10 may or may not generate symbology representative of the predicted sonic boom on one or more avionic display(s). In certain instances, relatively inconspicuous or non-obtrusive symbology may be generated on at least one of avionic displays 34, 36, 37 to inform a pilot, ATC personnel member, or other viewer of the impending sonic booms, while concurrently indicating that the sonic boom predictions are in compliance with their corresponding boom tolerance thresholds. Such symbology can be relatively small in size or color coded to a pre-established informational color (e.g., white or green) to provide the desired advisory function, without distracting from higher level information presented on displays 34, 36, 37. Alternatively, in other embodiments, symbology representative of such conforming sonic booms may not be expressed on avionic displays 34, 36, 37 to declutter the avionic display(s). Afterwards, avionic display system 10 returns to STEP 44 of method 40, and the above-described process steps repeat.

If, during STEP 48 of method 40, avionic display system 10 instead determines that a sonic boom is predicted both to occur and to trigger an overpressure event, avionic display system 10 generates symbology on one or more avionic displays indicative of the forecast overpressure event (STEP 52). Avionic display system 10 may generate the overpressure event symbology on any combination of avionic displays 34, 36, 37 in a manner visually signifying the forecast overpressure event. Such symbology usefully provides a visual indication of the ground strike location(s) of the impending sonic boom predicted to cause an overpressure event, the origin of the sonic boom or overpressure event, and/or other relevant parameters related to the forecast overpressure event. Examples of such symbology are discussed more fully below in conjunction with FIGS. 3-4. Furthermore, as indicated at STEP 54 of method 40, avionic display system 10 may also determine whether any preemptive actions or navigational solutions are available to the pertinent A/C to avert the forecast overpressure event. If found, any such preemptive actions or navigational solutions may also be presented on one or more of avionic displays 34, 36, 37. Examples of such preemptive actions are further discussed below in conjunction with FIGS. 3-5. Afterwards, avionic display system 10 returns to STEP 44, and method 40 loops.

Examples of Avionic Displays Including Forecast Overpressure Event Symbology

Figure 3:
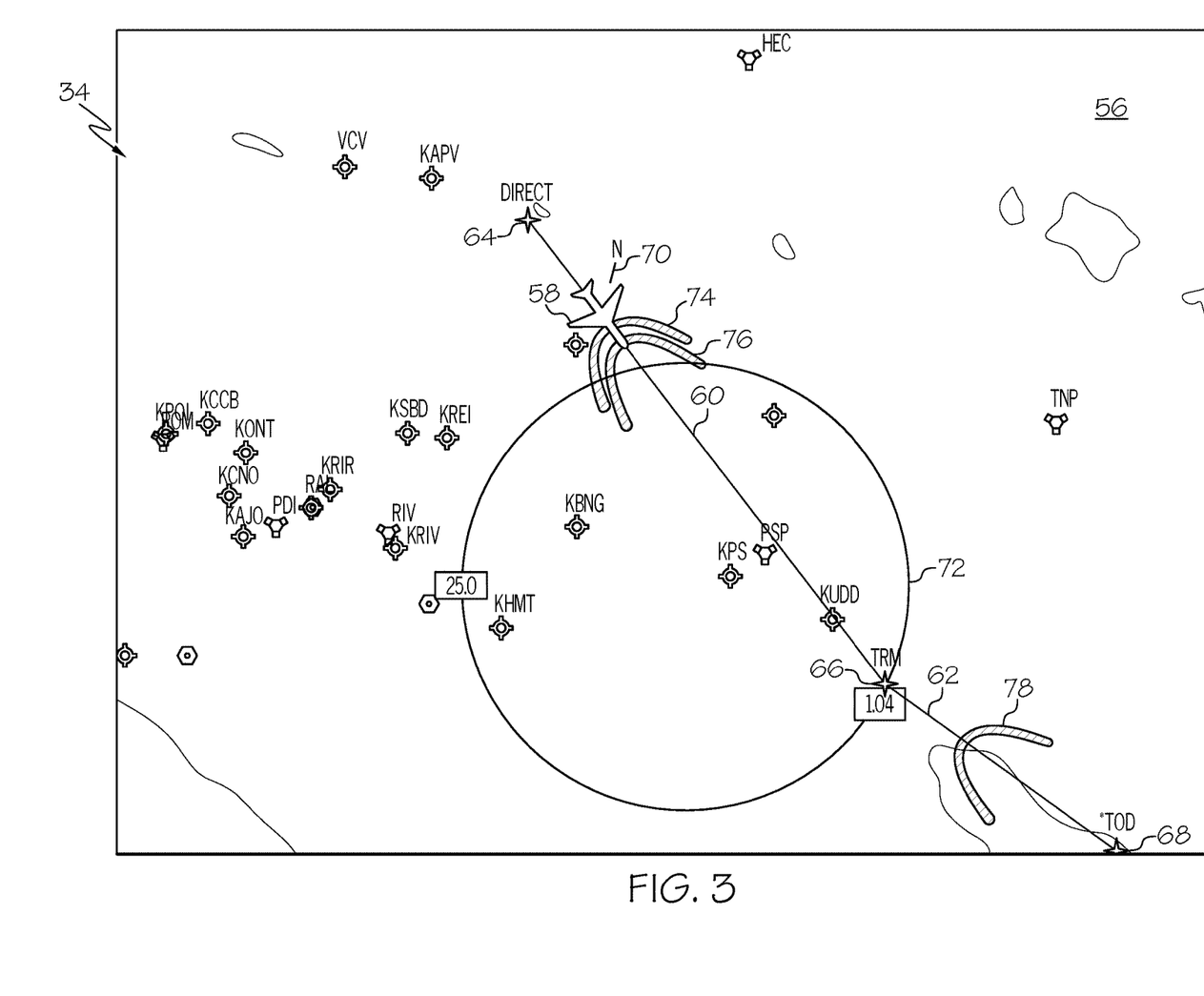
FIG. 3 is a screenshot of an exemplary HNAV display including forecast overpressure event symbology, which may be generated by the avionic display system of FIG. 1 when implementing the process set-forth in FIG. 2.

FIG. 3 is a screenshot of a HNAV display 34, which may be generated on avionic display device 14 by avionic display system 10 (FIG. 1) in an exemplary embodiment of the present disclosure. As can be seen, HNAV display 34 has a field-of-view (FOV) encompassing a geographical region represented by synthetic terrain 56. An A/C icon 58 appears on HNAV display 34 and indicates the current horizontal position (latitude and longitude) of the A/C under consideration, which may be the ownship A/C when avionic display system 10 is utilized for piloting purposes. The rotational orientation or clocking of A/C icon 58 denotes the current heading of the A/C, as visually emphasized by compass graphic 70 located adjacent icon 58. A horizontal multi-leg flight route graphic 60, 62 is also generated HNAV display 34 and indicates the planned flight route of the A/C. In this particular example, flight route graphic 60, 62 includes two legs as represented by connected line segments 60, 62. Line segment 60 extends from a first waypoint marker 64 (DIRECT) to a second waypoint marker 66 (TRM), while line segment 62 extends from waypoint marker 66 (TRM) to a third waypoint marker 68 (TOD). Avionic display system 10 may generated HNAV display 34 to further contain various other symbols or graphics conveying pertinent information, as desired; e.g., as further shown in FIG. 3, HNAV display 34 may also include a range ring 72 to provide a sense of scale.

Further presented on HNAV display 34 are three symbols 74, 76, 78, which visually signify overpressure events. Specifically, symbols 74, 76 are representative of an overpressure event that is forecast to occur in the immediate future or, perhaps, an overpressure event that is presently occurring. Symbol 74 may represent the beginning of the overpressure event (that is, the occurrence of the initial sonic boom underlying the overpressure event), while symbol 76 may represent the predicted conclusion of the overpressure event. Comparatively, symbol 78, which appears in the lower right corner of HNAV display 34, represents an overpressure event projected to occur in the more distant future, absent the performance of preemptive actions on behalf of the A/C represented by icon 58. Symbols 74, 78 may be positioned at locations representative of the origin of the sonic booms, as taken along the flight path of the A/C. In other embodiments, symbols 74, 78 may be positioned at ground strike locations associated with the sonic booms; and/or other graphics may be produced on HNAV display 34 indicative of the geographical locations at which the sonic booms or overpressure events are projected to impinge the earth. For example, in this latter regard, shading or a similar visual effect can be applied to selected regions of synthetic terrain 56 to identify the swath or region of land anticipated to be affected by an overpressure event.

The appearance of symbols 74, 76, 78 will vary amongst embodiments. As can be seen, in the example of FIG. 3, symbols 74, 76, 78 are generated as parabolic shapes or markers having geometries suggestive of pressure waves, as seen in two dimensions. If desired, symbols 74, 76, 78 can be visually coded to provide additional information useful in evaluating any forecast overpressure events. For example, as indicated in FIG. 3 by cross-hatching, one or more of symbols 74, 76, 78 may be color-coded based, at least in part, upon an estimated severity of a forecast overpressure event; e.g., as determined based upon the disparity between the sonic boom inducing the overpressure event and the corresponding boom tolerance threshold. If there exists a relatively minor discrepancy between the magnitude of a forecast sonic boom and the boom tolerance threshold, the predicted overpressure event may be categorized as relatively non-severe or mild and the symbol or symbols indicative of the overpressure event may be color coded to a pre-established warning color, such as amber. Conversely, if a relatively large discrepancy exists between the magnitude of the forecast sonic boom and the boom tolerance threshold, the corresponding symbol may be color coded to a pre-established alert color, such as red. The size, shape, or other visual characteristics of the symbology may also be varied in accordance with such a visual coding scheme. Animation or other visual effects can be applied in the case of high level alerts to further draw the attention of the viewer thereto, as appropriate.

Figure 4:
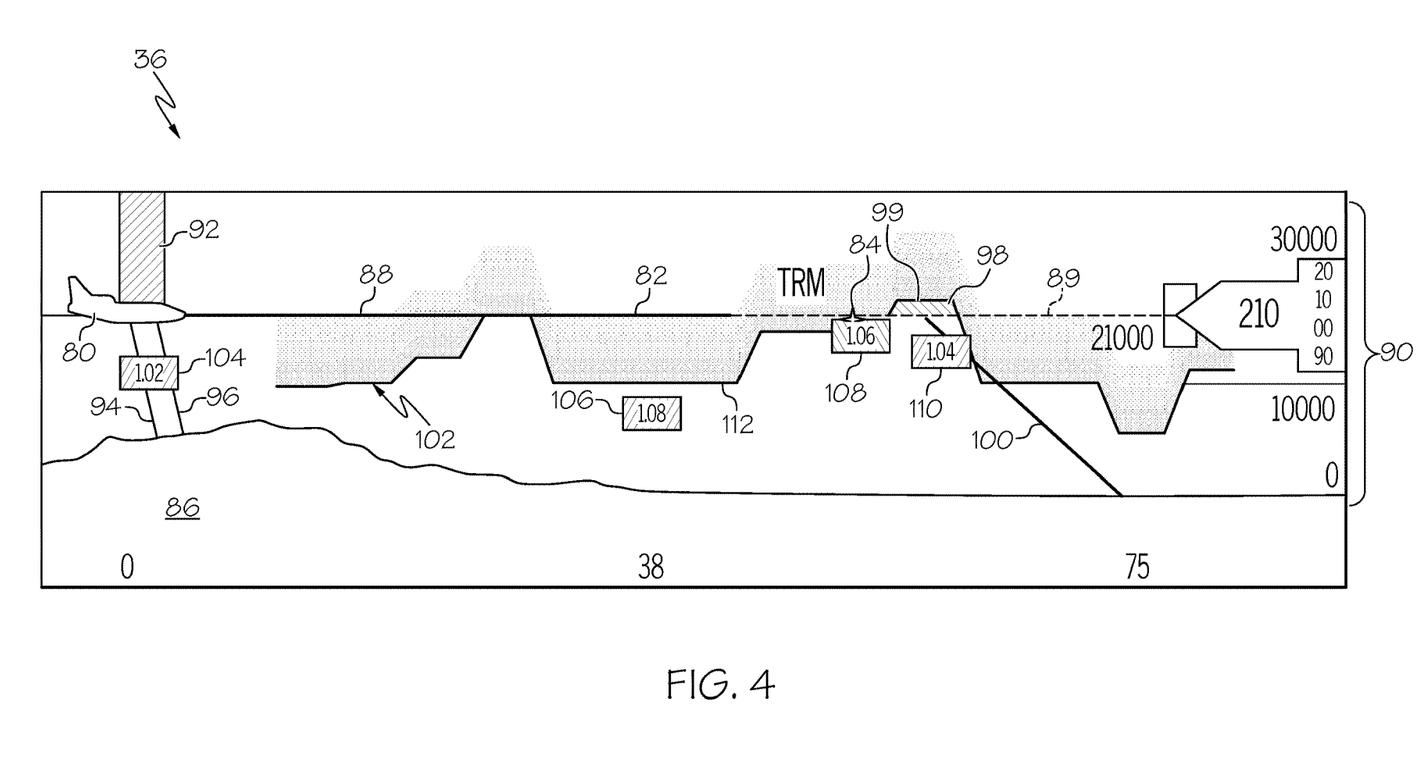
FIG. 4 is a screenshot of an exemplary VNAV display, which likewise includes forecast overpressure event symbology and which may be generated by the avionic display system in addition to or in lieu of the HNAV display shown in FIG. 3.

Turning now to FIG. 4, a screenshot of an exemplary VNAV display 36 is further presented. VNAV display 36 (FIG. 4) can be generated concurrently with HNAV display 34 in embodiments, in which case the symbology generated on VNAV display 36 may generally correspond to that generated on HNAV display 34. As does HNAV display 34, VNAV display 36 includes an ownship A/C icon 80 and a vertical multi-leg flight route graphic 82. In keeping with the exemplary flight scenario introduced above, flight route graphic 82 includes at least two legs represented by connected line segments extending from opposing sides of waypoint marker 84 (corresponding to waypoint marker 66 shown in FIG. 3). The geographical regions containing waypoint markers 64, 68 shown in FIG. 3 are offscreen in this example. VNAV display 36 further includes terrain graphics 86, which generally depict the topology profile of the terrain underlying the A/C; a flight trajectory indicator 88, which is generated as a line segment extending from the nose of A/C icon 80; an AGL altitude tape or scale 90 shown on the right of FIG. 4; and a Flight Level (FL) indicator 89, which extends from a readout window of scale 90 to indicate the current FL occupied by the A/C.

As does HNAV display 34 shown in FIG. 3, VNAV display 36 (FIG. 4) is generated to contain symbology indicative of forecast overpressure events in the present example. This symbology includes a number of symbols or "boom strike" graphics 94, 96, 100. As can be seen, boom strike graphics 94, 96, 100 are generated on HNAV display 34 to generally extend from the origin of the anticipated sonic booms to the ground strike locations of such sonic booms. Boom strike graphics 94, 96 thus specifically indicate the origins and projected ground strike locations of the sonic booms driving the overpressure events corresponding to symbols 74, 76 (FIG. 3). Comparatively, boom strike graphic 100 visually indicates the origin and projected ground strike location of the sonic boom driving the overpressure event corresponding to symbols 87 shown in FIG. 3. Visual coding may be applied to graphics 94, 96, 100 to, for example indicate the severity of the overpressure event at the point of ground strike or another characteristic pertaining to a predicted overpressure event, as previously described. In further embodiments, multiple graphics similar to graphics 94, 96, 100 may be generated and vary in color, thickness, or the like to convey the severity of any overpressure event and/or to indicate whether the A/C represented by icon 80 should perform certain actions (e.g., climb and/or reduce speed) prior to the identified point along the flight path of the A/C.

With continued reference to FIG. 4, VNAV display 36 can be generated to further include a plurality of graphical elements or markers, which identify minimum AGL altitudes at which an A/C can travel without triggering an overpressure event. In this particular example, these graphical elements are presented as a series of connected line segments collectively forming a boom floor graphic 102. The connected line segments forming boom floor graphic 102 vary in vertical positioning and, therefore, AGL altitude as taken along the length of graphic 102. The variance in vertical positioning of different segments of boom floor graphic 102 may be due to any number of factors, such as disparities in terrain topology, variations in the value of the boom tolerance threshold in different geographical regions encompassed by the present FOV of VNAV display 36, and/or changes in forecast weather conditions. Boom floor graphic 102 thus visually conveys minimum altitudes above which the A/C should remain as the A/C progresses along its flight path to avoid triggering an overpressure event. If desired, and as indicated in FIG. 4 by dot stippling, an appropriately-colored gradient fill or a similar graphical effect may be applied above boom floor graphic 102 to further indicate that A/C flight at altitudes above graphic 102 is acceptable.

When rising above or extending vertically beyond flight trajectory indicator 88 or flight level indicator 89, boom floor graphic 102 provides an intuitive visual cue that an overpressure event is forecast occur absent additional actions performed by the A/C corresponding to icon 80. Such overpressure event symbology is further emphasized by the provision of filled or shaded regions 92, 98, which may be generated in orange or another visually-striking color. Shaded regions 92, 98 may thus be regarded as secondary indicators of overpressure events, which further mark any point or points along the flight path of the A/C at which an overpressure event is forecast to occur. Specifically, as shown on the right side of FIG. 4, region 98 between boom floor graphic 102 and flight trajectory indicator 88 may be shaded in a predetermined color to further emphasize the projected occurrence of an overpressure event corresponding to boom strike graphic 100. Similarly, shaded region 92 may indicating the projected occurrence of an overpressure event corresponding to symbols 94, 96. In the exemplary flight scenario shown in FIG. 4, shaded region 92 extends to the top or to the upper edge of VNAV display 36 as the portion of boom floor graphic 102 corresponding to shaded region 92 is presently offscreen.

In the above described manner, the respective spatial relationship between boom floor graphic 102 and the other graphics presented on display 36 (e.g., A/C icon 80, flight trajectory indicator 88, and a flight level indicator 89) provide an intuitive visual cue as to permissible changes in altitude suitably implemented by the A/C represented by icon 80 without inducing an overpressure event. Consider, for example, the initial segment of boom floor graphic 102 appearing on the left side of VNAV display 36. Here, a relatively large vertical disparity exists between this portion of boom floor graphic 102 and flight trajectory indicator 88. Consequently, by glancing at this portion of VNAV display 36, a pilot (or other viewer of display 36) can quickly ascertain that the A/C represented by icon 80 can accelerate or descend, within reason, while ensuring with a relatively high confidence level that an overpressure event will not occur. Similarly, the relatively minor vertical disparity between the portion of boom floor graphic 102 and flight level indicator 89 visually indicates that the overpressure event corresponding to symbol 98 can likely be averted by ascending to an altitude equal to or above that identified by peak segment 99 of boom floor graphic 102. Similarly, by logical extension, this also indicates that the forecast overpressure event can likely be averted by a relatively modest deceleration of the A/C prior to reaching this juncture in the flight path.

Several numerical readouts 104, 106, 108, 110 are further presented on VNAV display 36. Numerical readouts 104, 106, 108 110 are expressed as Mach speeds in this example, but may be expressed in a different format (e.g., as airspeeds) in alternative embodiments. As shown in FIG. 4, numerical readout 108 expresses the predicted speed of the A/C corresponding to icon 80 at the TRM waypoint; hence, the positioning of readout 108 adjacent symbol 84. Comparatively, numerical readouts 104, 106, 110 specify the approximate maximum speed at which the A/C represented by icon 80 can travel, when located at corresponding AGL altitudes indicated by boom floor graphic 102, without triggering or inducing an overpressure event. Numerical readouts 104, 106, 110 can be generated at any suitable junctures or intervals along the anticipated vertical flight path of the A/C. In the illustrated embodiment, readouts 104 and 110 are generated at junctures corresponding to forecast overpressure events, while readout 106 is generated at a juncture corresponding to a prolonged dip or nadir of boom floor graphic 102. In certain embodiments, readouts 104, 106, 110 can be color coded in a manner indicative of the disparity between the values of readouts 104, 106, 110 and the current or predicted speed of the A/C represented by icon 80, as previously indicated.

Boom floor graphic 102 and the above-described numeral readouts may be determined by avionic display system 10 through a series of "what-if" or "if-then" queries, as taken along the trajectory of the A/C represented by icon 80 (FIG. 4). At least two data types may be requested utilizing "if-then" data queries transmitted from avionic display system 10 to a remote entity, such as a cloud-based forecasting service, in wireless communication with display system 10. First, a series of "if-then" data queries may identify minimum AGL altitudes at which an A/C is permitted to fly at specified supersonic speeds, while ensuring that the reference magnitudes of any anticipated sonic boom(s) remain below the corresponding boom tolerance threshold; that is, without triggering an overpressure event. Similarly, a second series of "if-then" data queries can be submitted to identify maximum (e.g., Mach) speeds suitably flown by an A/C at specified altitudes, while further avoiding the generation of overpressure events. In such embodiments, the "if-then" altitude requests submitted by avionic display system 10 (FIG. 1) may be based on standard or reduced vertical separation minima (RVSM). Avionic display system 10 may then deem the lowest response within an acceptable level as the minimum acceptable boom altitude. Avionic display system 10 may then generate boom floor graphic 102, as shown in FIG. 4, as a visualization of the altitude floor given each trajectory point (e.g., Mach) speed at which occurrence of an overpressure event can be avoided.

Figure 5:
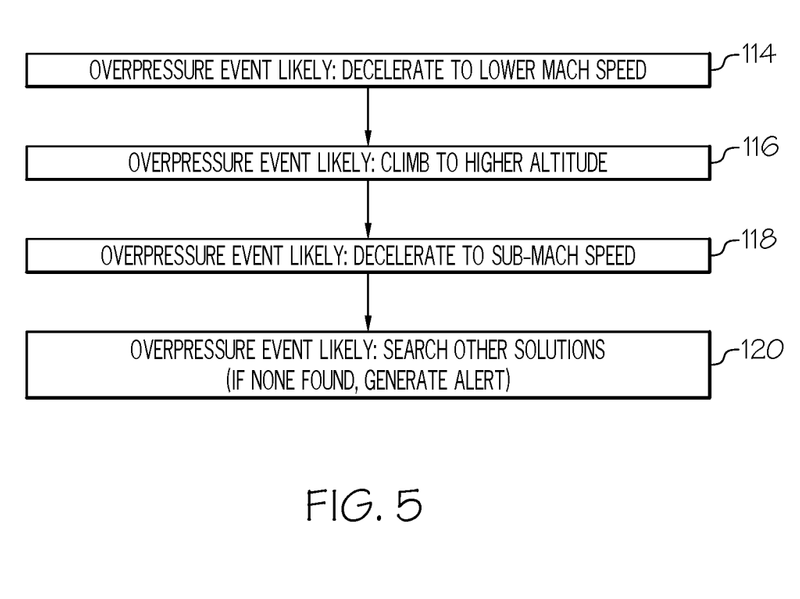
FIG. 5 illustrates an exemplary hierarchy of advisory messages, which can be selectively presented on one or more of the avionic displays generated by the avionic display system shown in FIG. 1 to provide suggested actions to avert the occurrence of forecast overpressure events.

In various embodiments, advisory messages can further be produced on one or more of displays 34, 36, 37 to convey suggested preemptive actions suitably performed to avoid occurrence of a forecast overpressure event. In such embodiments, avionic display system 10 may search and present such preemptive actions through "if-then" data queries of the type described above or utilizing a different approach. Display system 10 advantageously prioritizes the preemptive actions based upon selected performance criteria, such as timeliness, fuel efficiency, or emission levels. Consider, for example, FIG. 5 presenting one possible hierarchy of suggested preemptive actions. Here, solutions to decelerate to lower speeds are first searched (BLOCK 114) as such solutions can typically be implemented with minimal impact on fuel consumption and timeliness. If found, the solution may be presented on one or more of displays 34, 36, 37 as, for example, a text annunciation specifying a (e.g., Mach) speed to which the A/C would ideally decelerate ahead of the anticipated overpressure event. Instead, if no such solutions are found at BLOCK 114, avionic display system 10 next determines whether a forecast overpressure event can be avoided by climbing to particular AGL altitude or FL, if unoccupied by other A/C (BLOCK 116). Again, such solutions are presented if found. Otherwise, display system 10 may next consider solutions involving A/C deceleration to sub-Mach speeds (BLOCK 118), which may be prioritized below changes in altitude due to the fuel expenditure typically required to regain supersonic speeds. Finally, if necessary, other solutions may be searched and presented by display system 10, such as recommendations to reroute the A/C (BLOCK 120). Finally, if no solutions are found at this stage in the process, a visual alert may be generated on the avionic display(s) notifying a viewer of avionic displays 34, 36, 37 of the impending overpressure event.

The above-described navigational solutions or preemptive actions may be automatically presented on avionic displays 34, 36, 37; or, instead, only presented when receiving additional user input via interface 18 (FIG. 1). For example, in one embodiment, such preemptive actions may be presented when a pilot or other user selects symbology on one of displays 34, 36, 37 by, for example, hovering a cursor over a particular symbol. Similarly, in other embodiments, additional information pertaining to a particular overpressure event or sonic boom prediction may be presented to a pilot or other viewer when a particular symbol or graphic is selected. For example, in one embodiment, a user can hover a cursor over any chosen section of boom floor graphic 102 (FIG. 4) to summon a window or other graphic specifying the maximum permissible Mach speed and minimum permissible AGL altitude at the selected location along the A/C flight path. As previously indicated, color coding can be utilized to indicate or emphasize whether an A/C can accelerate (e.g., as may be indicated by a first predetermined informational color, such as green), should maintain on the current planned speed (e.g., as may be indicated by a second predetermined informational color, such as white), or should decelerate to avoid a forecast overpressure event (e.g., as may be indicated by a predetermined caution color, such as amber) at a particular moment in time.

CONCLUSION

The foregoing has thus provided avionic display systems and methods utilized in the generation of avionic displays including symbology relating the potential occurrence of overpressure events and, perhaps, other graphical elements aiding in the avoidance of overpressure events. The avionic display system may not perform sonic boom forecasting itself, but rather retrieve relevant sonic boom forecast data from a remote source and subsequently analyze the sonic boom forecast data to carry-out the above-described process steps. In other embodiments, the avionic display system may perform such forecasting algorithms on an independent basis. The provision of such forecast overpressure event symbology thus supports decision making during supersonic A/C flight to reduce the likelihood and severity of overpressure events. Further, the forecast overpressure event symbology may aid in such decision making on behalf of pilots operating manned or unmanned A/C capable of supersonic flight, as well as in the decision making of air traffic control authorities (e.g., ATC personnel) directing or advising the supersonic flight of at least one A/C. Finally, as further explained above, the sonic boom-related symbology described above can be generated on any number and type of avionic displays. Such avionic displays may include vertical navigation and horizontal navigation displays of the type described above, exocentric 3D displays (e.g., displays depicting the 3D flight environment of an A/C from a point external to the A/C), PFDs, and other 2D and 3D avionic displays.

In certain embodiments, the avionic display system includes a display device on which an avionic display is generated, a controller architecture operably coupled to the display device, and storage media containing computer-readable instructions. When executed by the controller architecture, the computer-readable instructions cause the avionic display system to perform the operations of: (i) determining when an overpressure event is forecast to occur due to the generation of a sonic boom having a magnitude exceeding a boom tolerance threshold; and (ii) generating symbology on the avionic display indicative of the forecast overpressure event when determining that an overpressure event is forecast to occur. In certain embodiments, the computer-readable instructions, when executed by the controller architecture, may further cause the avionic display system to: (iii) identify a geographical location corresponding to the forecast sonic boom; and (iv) assign a value to the boom tolerance threshold based, at least in part, on the identified geographical location. In such embodiments, the geographical location corresponding to the forecast sonic boom can be projected origin of the sonic boom or a location at which the sonic boom is projected to impact the earth. Similarly, in embodiments, the avionic display system may further include a database storing multiple georeferenced values for the boom tolerance threshold; and the avionic display system may assign a particular value to the boom tolerance threshold based, at least in part, on which of the multiple georeferenced values corresponds to the identified geographical location. In other embodiments, the avionic display system may identify and visually express a maximum reduced speed to which the aircraft can decelerate and/or a minimum altitude to which the aircraft can climb to avert a forecast overpressure event.

Terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A method carried-out by an avionic display system including a controller architecture, an avionic display device coupled to the controller architecture, and a database coupled to the controller architecture and storing multiple georeferenced values for a boom tolerance threshold, the method comprising:

generating an avionic display on the avionic display device;

determining when an overpressure event is forecast to occur due to the generation of a sonic boom having a magnitude exceeding the boom tolerance threshold, determining comprising:
  identifying, utilizing the controller architecture, a geographical location corresponding to a forecast sonic boom; and
  assigning a value to the boom tolerance threshold based, at least in part, on which of the multiple georeferenced values stored in the database corresponds to the identified geographical location; and
when determining that an overpressure event is forecast to occur, generating symbology on the avionic display indicative of the forecast overpressure event.

2. The method of claim 1 wherein identifying comprises identifying a geographical location at which the forecast sonic boom is projected to impact the earth.

3. The method of claim 1 further comprising generating the symbology to identify a location at which the sonic boom is projected to impact the earth.

4. The method of claim 1 further comprising generating the symbology to identify a projected origin of the sonic boom as taken along a flight path of an aircraft predicted to cause the forecast overpressure event.

5. The method of claim 1 wherein the avionic display comprises a vertical navigation display including terrain graphics representative of terrain; and
  wherein the method further comprises generating the symbology to include a graphic extending from a first point at which the forecast sonic boom originates to a second point at which the forecast sonic boom impacts the terrain.

6. The method of claim 1 further comprising generating the symbology to include at least one symbol that is visually coded based, at least in part, on estimated disparity between the magnitude of the forecast sonic boom and the boom tolerance threshold.

7. The method of claim 1 further comprising:
  when an overpressure event is forecast to occur during supersonic flight of an aircraft, identifying a preemptive action that can be performed by the aircraft to avert the forecast overpressure event; and
  presenting the preemptive action on the avionic display.

8. The method of claim 1 further comprising:
  when an overpressure event is forecast to occur during supersonic flight of an aircraft, identifying a maximum reduced speed to which the aircraft can decelerate to avert the forecast overpressure event; and
  visually expressing the maximum reduced speed on the avionic display.

9. The method of claim 1 further comprising:
  when an overpressure event is forecast to occur during supersonic flight of an aircraft, identifying a minimum altitude to which the aircraft can climb to avert the forecast overpressure event; and
  visually expressing the minimum altitude on the avionic display.

10. The method of claim 1 wherein the avionic display system further includes a wireless datalink operably coupled to the controller architecture; and
  wherein the method further comprises:
    wirelessly transmitting flight plan data for an aircraft to a remote source via the wireless datalink;
    in response to wireless transmission of the flight plan data, receiving sonic boom forecast data from the remote source at the avionic display system; and
    analyzing, utilizing the controller architecture, the sonic boom forecast data to determine whether an overpressure event is forecast to occur during supersonic flight of the aircraft.

11. The method of claim 1 further comprising recalling an aircraft-specific sonic boom profile from memory for usage in generation of the sonic boom forecast data.

12. The method of claim 1 further comprising assigning, utilizing the controller architecture, a higher value to boom tolerance threshold when the identified geographical region has a lower population density.

13. The method of claim 1 further comprising varying the boom tolerance threshold based, at least in part, on differences in local or regional nose abatement rules.

14. A method carried-out by an avionic display system including a controller architecture operably coupled to an avionic display device, the method comprising:
  generating an avionic display on the avionic display device;
  determining, utilizing the controller architecture, when an overpressure event is forecast to occur due to the generation of a sonic boom having a magnitude exceeding a boom tolerance threshold;
  prior to determining when the overpressure event is forecast to occur, assigning a value to the boom tolerance threshold based, at least in part, on a time-of-day at which the sonic boom is forecast to occur; and
  when determining that an overpressure event is forecast to occur, generating symbology on the avionic display indicative of the forecast overpressure event.

15. The method of claim 14 further comprising assigning, utilizing the controller architecture, a higher value to the boom tolerance threshold when the sonic boom is forecast to occur during waking hours.

16. A method carried-out by an avionic display system including a controller architecture operably coupled to an avionic display device, the method comprising:
  generating a vertical navigation display on the avionic display device;
  repeatedly establishing, utilizing the controller architecture, flight parameter margins enabling an aircraft to travel at supersonic speeds, while avoiding the generation of a sonic boom having a magnitude exceeding a boom tolerance threshold; and
  generating graphics on the vertical navigation display visually expressing the established flight parameter margins, the graphics comprising a boom floor graphic visually identifying minimum altitudes at or above which the aircraft can travel at supersonic speeds without generating a sonic boom having a magnitude exceeding the boom tolerance threshold.

17. The method of claim 16 wherein the avionic display system further comprises a wireless datalink operably coupled to the controller architecture; and
  wherein repeatedly establishing the flight parameter margins comprises:
    wirelessly transmitting flight parameter data for the aircraft to a remote source via the wireless datalink; and
    in response to wireless transmission of the flight parameter data, receiving the flight parameter margins from the remote source at the avionic display system.

18. The method of claim 16 wherein the established flight parameter margins further comprise minimum speeds at which the aircraft can travel, while avoiding the generation of a sonic boom having a magnitude exceeding the boom tolerance threshold; and wherein the method further comprises generating the graphics to include comprise numerical readouts generated on the vertical navigation display at selected junctures along an anticipated vertical flight path of the aircraft and expressing the minimum speeds.

19. The method of claim 16 further comprising:

generating the graphics to include at least one of a flight level indicator graphic and a flight trajectory indicator graphic on the vertical navigation display; and further generating the vertical navigation display such that a segment of the boom floor graphic rises above at least one of the flight level indicator graphic and the flight trajectory indicator graphic to indicate the forecast occurrence of a sonic boom having a magnitude exceeding the boom tolerance threshold.

20. The method of claim 16 further comprising generating a boom strike graphic on the vertical navigation display when a sonic boom having a magnitude exceeding the boom tolerance threshold is forecast to occur; and wherein the boom strike graphic comprises a line segment extending between an origin of the forecast sonic boom and a projected ground strike location indicated on the vertical navigation display.

\* \* \* \* \*